April 7, 1953 R. B. SHOSTAK 2,634,373
TUNING CONTROL SYSTEM
Filed Feb. 23, 1951
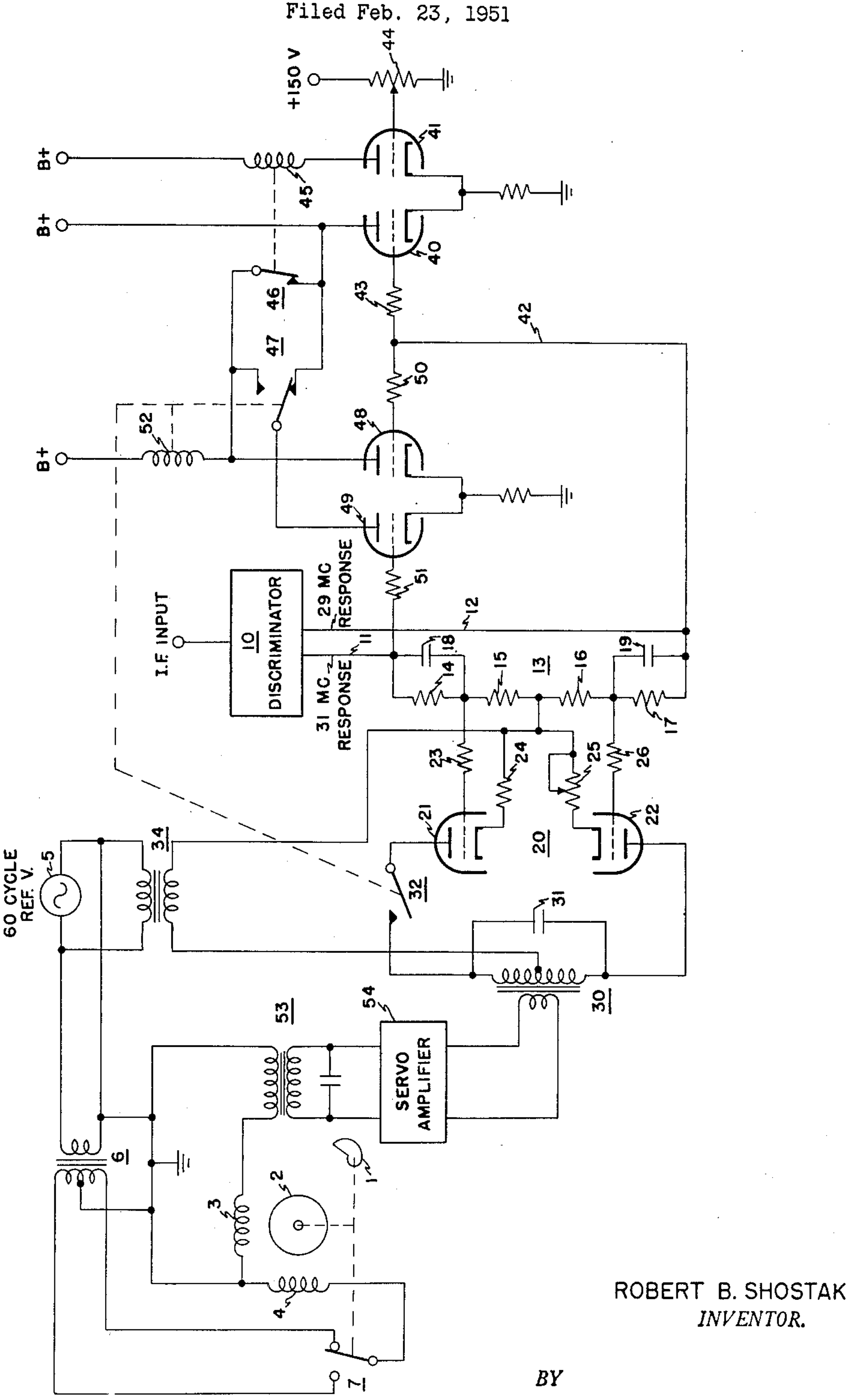
ROBERT B. SHOSTAK
*INVENTOR.*
BY
Killman and Kerst Patented Apr. 7, 1953 2,634,373

UNITED STATES PATENT OFFICE 2,634,373

TUNING CONTROL SYSTEM

Robert B. Shostak, Baltimore, Md., assignor to Bendix Aviation Corporation, Towson, Md., a corporation of Delaware Application February 23, 1951, Serial No. 212,445

11 Claims. (Cl. 250—40)

This invention relates to systems for the control of the frequency of electrical apparatus and more particularly to a system for the control of tuning mechanism which operates on a frequency stable electrical device to maintain a constant frequency difference between it and an unstable reference device.

The maintenance of a constant frequency difference between such devices is a difficult matter, since the reference device may depart suddenly and unpredictably from its previous frequency, necessitating a search by the tuning mechanism at a high speed until the new frequency is found. Once found, the high speed searching action must be terminated and a slower tracking action inaugurated. At this point the sense of the changing frequency of the reference device with respect to the stable device must be taken into account in the control of the tuning mechanism, to insure that the latter drives the stable mechanism in the proper direction to reduce the discrepancy, rather than in a direction to increase it.

It is an object of this invention to provide a tuning control system which causes the tuning mechanism of a frequency stable device to maintain a high constant tuning speed when the frequency discrepancy between that device and a reference device exceeds certain limits and, when said discrepancy is within said limits, causes said tuning mechanism to tune said frequency stable device in the proper sense and speed so as to arrive at and to maintain constant a desired frequency difference between said devices.

It is a further object of the invention to provide such a system which is simple of construction and reliable in operation.

The above and other objects and advantages of the invention are realized by a system in which a tuning element of the frequency stable device is driven between limits at a high fixed speed in search. The driving element is a two-phase motor, the phase of one component of the exciting voltage being mechanically reversed when the tuning limits are reached. A discriminator provides opposed D. C. error voltages, the response being peaked at points equidistant from a desired frequency difference. The discriminator outputs are applied to a balanced modulator to which is also applied a voltage having the same phase as the reference voltage component of the tuning motor exciting voltage. The output of the balanced modulator is utilized as the second component of the tuning motor exciting voltage.

A relay system is provided which responds to the discriminator output in a manner to maintain the output of the balanced modulator unbalanced and therefore to cause the tuning motor to maintain a constant high speed in search until the frequency difference between the two devices is within prescribed limits and is changing in a particular sense. At this point the relay system restores the modulator to balance and the motor will be excited by the output of the modulator in a manner to track the desired frequency difference.

The single figure of the drawing is a schematic diagram of a circuit embodying the invention.

The circuit illustrated may, by way of example, be utilized for driving a stable local oscillator or stalo in a manner to maintain an I. F. of 30 mc. between its frequency and that of a reference magnetron. A tuning element 1 of the stalo is driven between limits by a two-phase motor 2 having the field windings 3 and 4. A source 5 of 60 cycle voltage supplies exciting voltage of a reference phase which is applied to a transformer 6. One terminal of the primary of this transformer is connected directly to the center tap of the secondary and this junction is grounded and connected to the junction of windings 3 and 4. The other terminal of winding 4 is connected to the movable contact of a single pole-double throw switch. The fixed contacts of this switch are connected to the terminals of the secondary of transformer 6. The switch 7 is actuated by the motor 2 when the tuning element 1 is driven to either of its limits. It can be seen that actuation of the switch 7 reverses the phase of the voltage across winding 4. The terminals of the winding 3 are connected across the secondary of a transformer 53. The derivation of the voltage applied to this transformer will be explained later.

The discriminator is not illustrated in detail in the drawing since it is of conventional form, but is indicated as a box 10. By way of example, it may be assumed, as previously stated, that it is desired to maintain a receiver intermediate frequency at 30 megacycles with respect to the frequency of some unstable reference source such as a magnetron. In this event the discriminator may be constructed to have a peaked response at 29 mc. and at 31 mc. It will then have D. C. error voltage outputs proportional to the proximity of the I. F. frequency to these frequencies. The output due to 31 mc. response is indicated as applied by lead 11 and that due to 29 mc. response as applied by lead 12 to the end terminal of an anti-hunt circuit 13.

This circuit comprises a voltage divider composed of four serially connected resistors 14, 15, 16 and 17. Resistors 14 and 17 are shunted by condensers 18 and 19 respectively. The complete circuit is balanced above ground and may be said to have a floating ground. This circuit is necessary in order to avoid over-shoot of the tuning motor as the I. F. approaches 30 mc. At this part of the discriminator characteristic curve, the error voltage is changing most rapidly as indicated by the fact that the typical discriminator characteristic curve has its greatest slope in this region. The time constants of these R. C. circuits at the ends of the voltage divider are made such that if the error voltage is changing fast enough to cause over-shoot, the condensers will not fully discharge, the voltage due to the charge remaining on the condensers will be added to the error voltage, and the balanced modulator will see an opposite polarity before the true crossover point is reached. The tuning motor will therefore be slowed down and will coast into final position, locking in at the 30 mc. I. F. point.

The balanced modulator is indicated at 20. It is composed of two triodes 21 and 22. The grid of tube 21 is connected through a resistor 23 to the junction point of resistors 14 and 15 and the grid of tube 22 is connected through resistor 26 to the junction of resistors 16 and 17. The cathode of tube 21 is connected to the electrical center of the voltage divider through resistor 24 and the cathode of tube 22 is connected to the same point through a variable resistor 25. The latter resistor is a centering control for compensating for differences in the anti-hunt divider and the two sections of the balanced modulator. The resistors 23 and 26 are for the purpose of limiting grid current flow. The anodes of tubes 21 and 22 are connected to the opposite terminal of a parallel resonant circuit comprising the primary winding of the transformer 30 shunted by a condenser 31. This circuit is tuned to the frequency of the tuning motor exciting current. A relay actuated switch 32 interrupts one anode circuit. This switch is closed when the balanced modulator is functioning as such.

Voltage from the source 5 is applied to the balanced modulator through a transformer 34, the secondary of which is connected between the junction point of resistors 15 and 16, and the center tap of the primary of transformer 30. The secondary of the transformer 30 is connected to a servo amplifier 54 the output of which is applied to the tuned primary of transformer 53.

In operation, the balanced modulator conducts only during the half of each cycle when the plate circuit is positive with respect to the cathode. When there is no error voltage applied to the modulator both tubes conduct equally and, since the outputs at the fundamental frequency of source 5 are 180° out of phase, they cancel in the transformer 30. If there is an error voltage applied to the modulator, one half of it conducts more than the other according to the polarity of the resultant current flow through the voltage divider 13, which in turn depends upon the direction of frequency error. There is, therefore, a greater flow of current through one half of the primary of transformer 30 than through the other. There is a voltage induced into the secondary of transformer 30, due to this resultant flow of current in the primary, in direct proportion to the magnitude of the error voltage, and of one of two opposite phases, the phase depending upon which half of the primary is conducting the greater current flow. The output of the balanced modulator is thus a modulated 60 cycle voltage which is amplified and utilized as one component of the exciting voltage of the tuning motor.

When the relay operated switch 32 is open one half of the balanced modulator is rendered inoperative and the remaining half, including the tube 22 and the lower half of the primary of transformer 30, acts merely as a tuned coupling, causing a fixed phase 60 cycle voltage to be induced in the secondary winding and the tuning motor to be driven at rated speed in search, regardless of the discriminator output.

Control of the operation of the switch 32 is provided by a relay system which will now be described.

The system includes a pair of cathode coupled triodes 40, 41. The component of the discriminator error voltage due to 29 mc. response is applied through leads 12 and 42 and resistor 43 to the grid of tube 40. The tube 41 is normally rendered conductive by the application of a fixed positive voltage by way of a potentiometer 44 to its grid. The plate lead of this tube includes the coil of a relay 45 operating a switch 46. The switch is shown in closed position which is the energized position of the relay.

The contacts of this switch are connected to respective contacts of a switch 47. The lower contacts of switches 46 and 47 are connected to a source of plate supply voltage. The movable contact of switch 46 and the upper contact of switch 47 are connected to the plate circuit of a triode 48. This tube is cathode coupled to a triode 49. The plate of tube 49 is connected to the movable contact of switch 47. The component of the discriminator error voltage due to the 29 mc. response is applied to the grid of tube 48 through resistor 50. The component of discriminator error voltage due to 31 mc. response is applied to the grid of tube 49 through a resistor 51. In the plate circuit of tube 48 is the coil of a relay 52 which operates switches 47 and 32. These switches are shown in the positions they occupy when the relay 52 is deenergized.

In the drawing the system is shown with the various switches in the positions they occupy when the I. F. is far from the desired 30 mc. value. The switch 32 is open and the tuning motor is consequently turning at rated speed, searching for the frequency of the magnetron. The tube 49 is receiving plate supply voltage through switch 47. The switch 47 is short circuited by switch 46. Relay 45 is energized and will remain so until the I. F. approaches the vicinity of 29 mc. When this happens, and the voltage on the grid of tube 40 is raised sufficiently, the tube conducts. Due to the cathode coupling the tube 41 becomes nonconductive and the relay 45 is deenergized. The relay will remain deenergized while the I. F. is within a region extending from below 29 mc. to well above 30 mc. When this frequency goes beyond 31 mc. the relay will again be energized.

When the relay 45 is deenergized, however, the switch 46 will be opened and the short circuit of switch 47 removed. Due to the direct cathode coupling of tubes 48 and 49, however, the relay 52 will not be actuated until the discriminator 29 mc. response exceeds the 31 mc. response. When this occurs tube 48 will conduct and switch 47 will be actuated, closing its movable and upper contacts. This will cause the output of tube 49 to be applied, together with that of tube 48, to the relay 52 and will maintain it in an energized state regardless of which component of the discriminator error voltage subsequently becomes the greater. The energization of relay 52 closes switch 32 so that the modulator 20 becomes balanced and its output causes the tuning action to be one of tracking.

Should the reference frequency change so that the I. F. departs substantially from the vicinity of the 29 mc. frequency the relay 45 will again be energized, the switch 47 will be shorted by the closing of switch 46 and the relay 52 will become deenergized. The tuning device will thereupon begin searching again.

The effect of the above described mode of operation is to prevent the system from going into its tracking function unless the I. F. is changing toward 30 mc. from a value which is less than that. It is necessary that a restriction of this type be incorporated into the system in order to prevent the possibility of the tuning element being driven in a direction to increase, rather than diminish, the error.

In order to make more clear the necessity for this restriction, let us consider two possible sets of circumstances. Let it first be assumed that the magnetron frequency is at 1290 mc. and the stable local oscillator, or stalo, is at 1310 mc. and is being caused to search toward 1320 mc. The switches will be in the positions illustrated with relay 45 energized and relay 52 deenergized. The modulator 20 will be unbalanced, with the output of tube 22 alone providing the voltage which determines the direction of tuning motor rotation. As the stalo approaches 1319 mc. (29 mc. I. F.) relay 45 deenergizes and then relay 52 is energized.

With the closing of switch 32 the modulator 20 becomes balanced and the tuning motor will thence forth be driven in track. But, since the 29 mc. discriminator response will still predominate, the phase of the modulator output will continue to be dictated by the predominance of current flow through tube 22 and will therefore remain unchanged. The tuning motor will continue to be driven in the same direction until the 30 mc. I. F. is reached, whereupon the stalo will be locked in.

Now let it be assumed that the magnetron is at 1290 mc. and the stalo is at 1250 mc. and being driven toward 1260. In other words, the I. F. is approaching 30 mc. from a high to a low value. The switches will again be as shown. When the stalo approaches 1259 mc. (31 mc. I. F.) relay 45 will be deenergized. But the relay 52 will not be energized until the I. F. has gone on past 30 mc. and approaches 29 mc. Again the phase of the output of the balanced modulator will be unchanged as it goes from the search to the tracking output and the tuning motor will continue tuning in the same direction until the I. F. is so low that relay 45 again becomes energized. The tuning motor will drive until the tuning limit is reached and then reverse. As the I. F. now increases the system will lock in on 30 mc. as in the first example. Alternatively, if the 30 mc. I. F. is found on the other side of the magnetron frequency before the limit is reached, it will lock in.

Let us suppose now that in the example just given, with the I. F. decreasing toward 30 mc. the relay 52 had been actuated at 31 mc. just after relay 45 was denergized. With the closing of switch 32, the current flow through tube 21 would predominate over that through tube 22 and the phase of the output of modulator 20 would be reversed with respect to the phase it had had during the searching condition just preceding. The direction of rotation of the tuning motor would be reversed and the stalo frequency would start decreasing while the I. F. would be increasing toward 32 mc. As the tuning motor reached the end of its travel and was automatically reversed the same set of conditions would again come into being and with the same result. An I. F. of 30 mc. could not be reached under such circumstances, but would simply be approached as a limit, so that the stalo would be continuously tuned to and fro between this limit and that provided by the reversing switch.

What is claimed is:

1. A system for maintaining a desired fixed frequency separation between a tunable alternating current generator and an unstable reference source of alternating current, said system comprising means for tuning said generator back and forth between fixed frequency limits, a discriminator having response peaks at two frequencies above and below said separation frequency, means applying to said discriminator a voltage having a frequency which is the difference between the frequencies of said generator and said source, and means responsive to the outputs of said discriminator to control said tuning means, said control means comprising a balanced modulator having the outputs of said discriminator applied thereto, means applying the output of said balanced modulator to said tuning means in a manner to control the direction of said tuning in accordance with the phase thereof and the speed of said tuning in accordance with the amplitude thereof, means operable to disable one-half of said balanced modulator, and means for the control of said disabling means, the last named control means comprising a first relay operable when energized to actuate said disabling means, means responsive to a preponderance of the output of said discriminator at one end of said peak frequencies to energize said relay, disabling means for said first relay, a second relay operative when energized to actuate the last named disabling means, and means energizing said second relay, the last named means being responsive to a predetermined level of response of said discriminator at said one of said peak frequencies to denergize said second relay.

2. A system for maintaining a desired fixed frequency separation between a tunable alternating current generator and an unstable reference source of alternating current, said system comprising means for tuning said generator back and forth between fixed frequency limits, discriminator means responsive to the difference frequency between the outputs of said generator and said source and having response peaks at a pair of frequencies above and below said desired separation frequency, means controlling said tuning means and having two operating states, in the first of which it drives said tuning means at a fixed rate between said limits, and in the second of which it drives said tuning means in a direction which is a function of the sense of the difference of the outputs of said discriminator at said pair of frequencies and at a rate which is a function of the magnitude of said difference, and means selecting the operating states of said controlling means as a function of the value and direction of change of said difference frequency, said selecting means comprising a first relay controlled by the output of said discriminator and operable to establish said first state when the output of said discriminator at one of said peaked response points predominates, a second relay operable when energized to disable said first relay and means operable when the output of said discriminator at said one of said peaked response points reaches a predetermined level to deenergize said second relay.

3. A control system responsive to the frequency of an alternating current to actuate a control element, said system comprising a discriminator having a pair of outputs, the amplitude of each of said outputs being a function of the proximity of the frequency of said alternating current to a respective reference value, a first relay operable when energized to actuate said element, means responsive to the predomination of one of said outputs to energize said relay, means normally maintaining said second relay in an energized state, a second relay operable when energized to disable said first relay and means operable when said one of said outputs of said discriminator reaches a predetermined level to deenergize said second relay.

4. A control system responsive to the frequency of an alternating current to actuate a control element, said system comprising a discriminator having a pair of outputs, the amplitude of each of said outputs being a function of the proximity of the frequency of said alternating current to a respective reference value, a relay operable when energized to actuate said element, means for energizing said relay when the amplitude of one of said outputs is greater than the amplitude of the other, said energizing means comprising a pair of electron discharge devices each having a cathode, an anode and a control electrode, the cathodes of said devices being directly coupled, means applying each of said outputs to a respective one of said control grids, a source of plate supply voltage, the coil of said relay being connected between said source and the plate of the one of said devices to the grid of which said one of said outputs is applied, a switch actuated by said relay and operable when said relay is energized to connect the plate of the other of said devices to said source through said relay coil and operable when said relay is deenergized to establish an alternative connection between said plate of said other device and said source, and means operable when said one of said outputs reaches a predetermined level to short circuit said switch.

5. A control system as claimed in claim 4, the last named means comprising a second relay, a second switch actuated by said second relay and operable when said second relay is energized to short circuit the first mentioned switch, and means responsive to said one of said outputs and operable when said output exceeds a certain level to energize said second relay.

6. A control system as claimed in claim 4, the last named means comprising a second relay, a second switch actuated by said second relay and operable when said second relay is energized to short circuit the first mentioned switch, and means responsive to said one of said outputs and operable when said output exceeds a certain level to energize said second relay, the last named means comprising a pair of electron discharge devices, each having a plate, a cathode and a control electrode, the cathodes of said devices being directly connected, the first of said devices having the coil of said second relay connected in its plate circuit and a fixed bias voltage applied to its control electrode whereby said second relay is normally energized, and means applying said one of said discriminator outputs to the control electrode of the second of said devices, the value of said fixed bias voltage being so selected that said second device will be rendered conductive and said first device non-conductive when said one of said outputs reaches a certain value.

7. A system for maintaining a desired fixed frequency separation between a tunable alternating current generator and an unstable source of alternating current, said system comprising means for tuning said generator back and forth between fixed frequency limits, discriminator means responsive to the difference frequency between the outputs of said generator and said source and having response peaks at a pair of frequencies above and below said desired separation frequency, means differentially comparing the outputs of said discriminator at said response peaks and deriving from said comparison an alternating control voltage having a phase and magnitude corresponding to the sense and magnitude of the difference between said discriminator outputs, means applying said control voltage to said tuning means in a manner to control the direction and rate of tuning as a function of the phase and magnitude of said control voltage, a switch for interrupting, when open, the application of one of said discriminator outputs to said comparing means, and operating means for said switch comprising a pair of relays, the first of said relays being connected to close said switch when energized, means responsive to the outputs of said discriminator and operable to energize said first relay when the amplitude of the other of said discriminator outputs is greater than that of said one of said outputs, means connecting the second of said relays to disable said first relay when it is energized and means operable to deenergize said second relay when said other of said discriminator outputs exceeds a certain value.

8. A system for maintaining a desired fixed frequency separation between a tunable alternating current generator and an unstable source of alternating current, said system comprising means for tuning said generator back and forth between fixed frequency limits, discriminator means responsive to the difference frequency between the outputs of said generator and said source and having response peaks at a pair of frequencies above and below said desired separation frequency, means differentially comparing the outputs of said discriminator at said response peaks and deriving from said comparison an alternating control voltage having a phase and magnitude corresponding to the sense and magnitude of the difference between said discriminator outputs, means applying said control voltage to said tuning means in a manner to control the direction and rate of tuning as a function of the phase and magnitude of said control voltage, and means operable to interrupt the application of one of said discriminator output voltages to said comparison means, the last named means being responsive to said discriminator outputs and operable to interrupt said application except when said difference frequency is approaching the value of said desired frequency separation in a predetermined sense, said last named means comprising a switch and a pair of relays, the first of said relays being operable when energized to drive said switch to its non-interrupting position, means responsive to the outputs of said discriminator and operable to energize said first relay when the amplitude of the other of said discriminator outputs is greater than that of said one of said outputs, means connecting the second of said relays to disable said first relay when it is energized and means operable to deenergize said second relay when said other of said discriminator outputs exceeds a certain value.

9. A system for maintaining a desired fixed frequency separation between a tunable alternating current generator and an unstable source of alternating current, said system comprising means for tuning said generator back and forth between fixed frequency limits, discriminator means responsive to the difference frequency between the outputs of said generator and said source and having response peaks at a pair of frequencies above and below said desired separation frequency, means differentially comparing the outputs of said discriminator at said response peaks and deriving from said comparison an alternating control voltage having a phase and magnitude corresponding to the sense and magnitude of the difference between said discriminator outputs, means applying said control voltage to said tuning means in a manner to control the direction and rate of tuning as a function of the phase and magnitude of said control voltage, and means operable to interrupt the application of one of said discriminator output voltages to said comparison means, the last named means being responsive to said discriminator outputs and operable to interrupt said application except when said difference frequency is approaching the value of said desired frequency separation in a predetermined sense, said last named means comprising a switch, means operable when the amplitude of the other of said discriminator outputs is greater than that of said one of said outputs to drive said switch to its non-interrupting position, and means responsive to said other of said discriminator outputs and operable to disable said driving means except when the amplitude of said other output exceeds a certain value.

10. A control system responsive to the frequency of an alternating current to actuate a control element, said system comprising a discriminator having a pair of outputs, the amplitude of each of said outputs being a function of the proximity of the frequency of said alternating current to a respective reference value, a relay, means connecting said relay to actuate said control element when said relay is energized, switch means connected to energize said relay, said switch means having applied thereto the outputs of said discriminator and being operative to energize said relay when a selected one of said outputs exceeds the other, means connected to said relay to normally disable the same, and means applying said one of said outputs to said disabling means, said disabling means being responsive to a predetermined level of said output voltage to terminate its disabling action.

11. A control system responsive to the frequency of an alternating current to actuate a control element, said system comprising a discriminator having a pair of outputs, the amplitude of each of said outputs being a function of the proximity of the frequency of said alternating current to a respective reference value, a relay, means connecting said relay to actuate said control element when said relay is energized, said switch means comprising a pair of electron discharge devices each having a cathode, an anode and a control electrode, means coupling said cathodes, means coupling a respective one of said outputs to each of said control electrodes, means connecting said relay to the anode of the one of said devices to which a selected one of said outputs is coupled, means connecting the anode of the other of said devices to said relay, the last named means comprising a switch actuated by said relay, a source of plate supply voltage, said switch when in one position connecting said anode to said relay and when in another position disconnecting said anode from said relay and connecting it to said source, disabling means for said relay, and means rendering said disabling means inoperative when said selected one of said outputs exceeds a predetermined level.

ROBERT B. SHOSTAK.

REFERENCES CITED

The following references are of record in the file of this patent:

UNITED STATES PATENTS

| Number | Name | Date |
|---|---|---|
| 2,369,542 | Dietrich | Feb. 13, 1945 |
| 2,478,977 | Nicholson | Aug. 16, 1949 |